United States Patent [19]

Tomlin

[11] Patent Number: 4,565,349
[45] Date of Patent: Jan. 21, 1986

[54] FAIL SAFE HYDRAULIC PILOTED PRESSURE REDUCING AND REGULATING VALVE

[75] Inventor: Jerry B. Tomlin, Sugar Land, Tex.

[73] Assignee: Koomey, Inc., Brookshire, Tex.

[21] Appl. No.: 591,369

[22] Filed: Mar. 20, 1984

[51] Int. Cl.⁴ .......................................... G05D 16/00
[52] U.S. Cl. .................................... 251/29; 251/63.4; 251/94; 91/44; 91/45
[58] Field of Search .............. 91/44, 45; 251/94, 63.4, 251/89, 29; 92/28

[56] References Cited

U.S. PATENT DOCUMENTS

| | | | |
|---|---|---|---|
| 3,654,833 | 4/1972 | Griffiths | 91/45 |
| 4,185,539 | 1/1980 | Stratienko | 91/45 |
| 4,444,216 | 4/1984 | Loup | 137/116 |

OTHER PUBLICATIONS

Koomey, Inc. General Catalog—1982–1983 (Part No. 1112–4100, p. 201).

Primary Examiner—Alan Cohan
Attorney, Agent, or Firm—Fulbright & Jaworski

[57] ABSTRACT

A hydraulic piloted pressure reducing and regulating valve which is fail safe for holding the valve at the last selected operating pressure in the event of the loss of control signals. A pressure regulating valve having a body and a control piston therein is provided with a pilot piston in the body which is adapted to be connected to a hydraulic pilot pressure. A spring is provided between the pilot piston and the control piston whereby the control piston can move in response to flow demands in the valve. A rod is connected to the pilot piston with a locking sleeve engaging the rod and releasably locking the rod and pilot piston against movement. A hydraulic pressure port is in communication with the space between the rod and the sleeve for releasing the rod upon application of pressure to the port. The port and the pilot piston are separately connected to a hydraulic fluid supply and a control system whereby upon failure the valve will maintain the last selected operating pressure.

7 Claims, 5 Drawing Figures

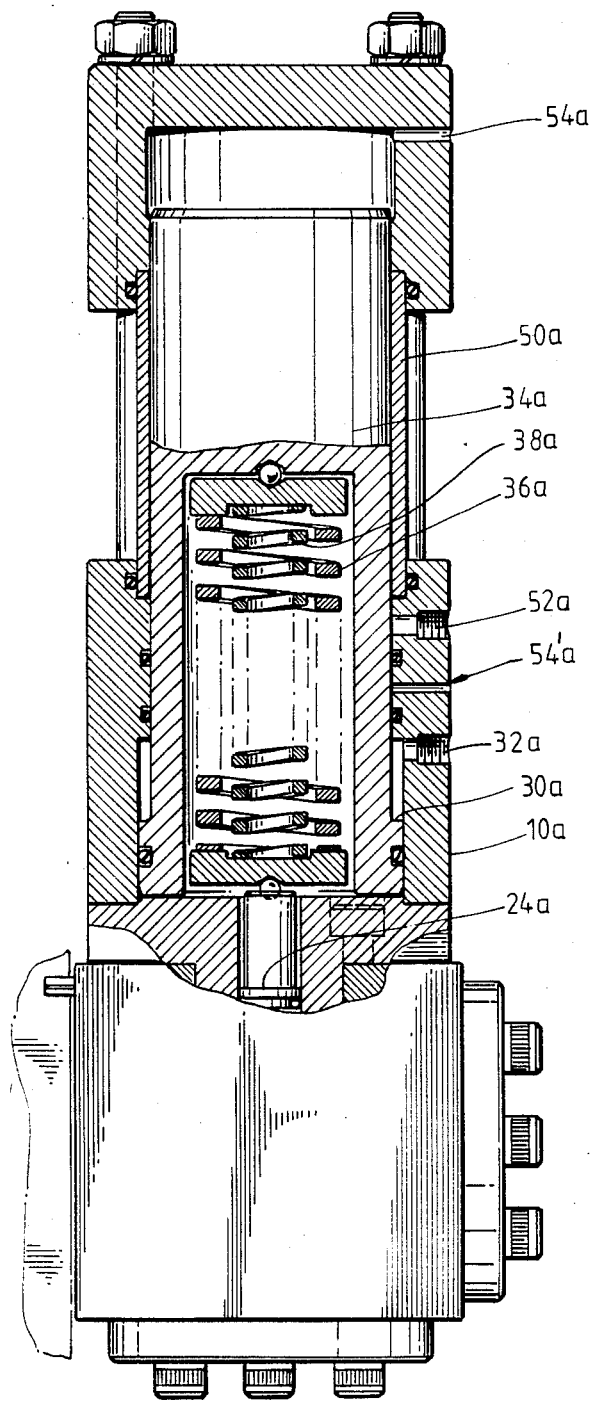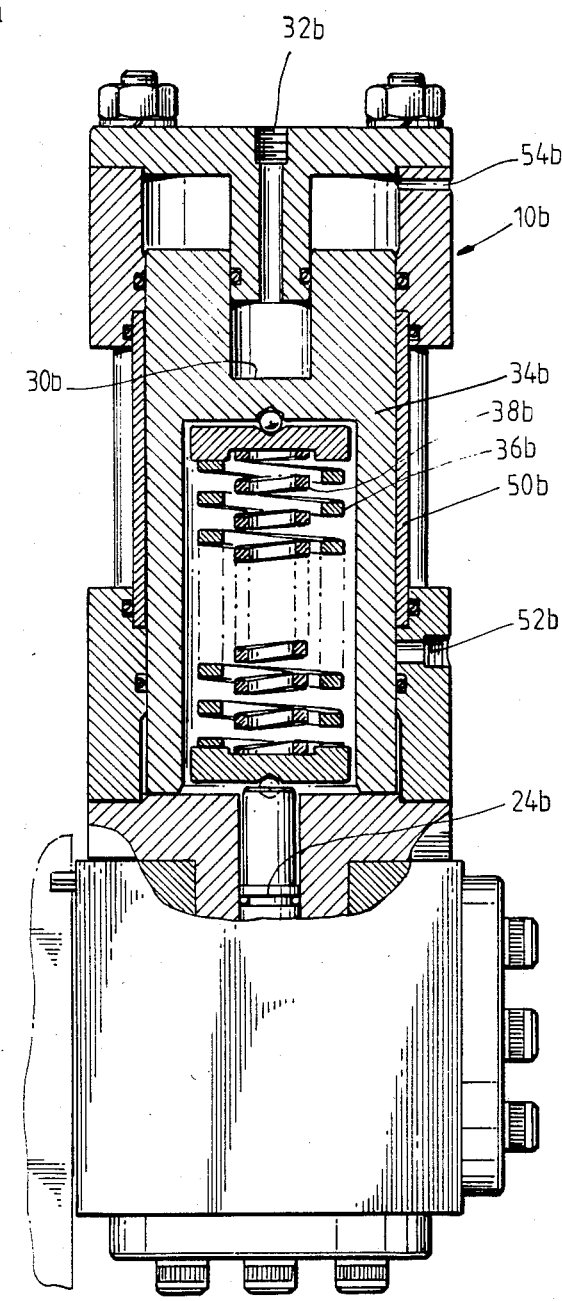

FAIL SAFE HYDRAULIC PILOTED PRESSURE REDUCING AND REGULATING VALVE

BACKGROUND OF THE INVENTION

In controlling various oil field equipment, such as blowout preventers, production trees and other hydraulically actuated equipment, it is customary to provide a hydraulic supply at a high pressure, for example 3,000 psi. However, the equipment works at a pressure lower than the supply pressure and it is necessary to reduce and regulate the pressure to the desired working pressure for the equipment. For example, in present subsea control systems, a hydraulic piloted pressure reducing and regulating valve, Part No. 1112-4100, shown on page 201 of the General Catalog 1982-1983 of Koomey, Inc. illustrates a conventional hydraulic piloted pressure regulating valve which has an inlet pressure of 3,000 psi and provides a regulated outlet pressure of 300 to 1,500 psi. In such a valve a remote pilot signal pressure is connected to the regulator valve to provide a remote means for adjusting the regulated pressure to a control piston which then moves in response to flow demands on the valve.

The problem with the present hydraulic piloted pressure reducing and regulating valves is that if the control system fails thereby causing a loss of the pilot signal this is equivalent to issuing a command signalling the regulating valve to vent off the regulated pressure to zero. This means that the equipment being operated by the outlet supply pressure from the valve becomes inoperative. In the case of safety equipment such as oil well blowout preventers this could lead to a disaster.

The present invention is directed to a hydraulic piloted pressure reducing and regulating valve which includes a fail safe means for holding the valve at the last selected operating pressure in the event of the loss of control signals. Thus, even though the valve may be unable to change its regulated pressure, the regulated pressure will not drop to zero, but will be maintained at its last pressure setting. Therefore, the controlled equipment will still be operable.

SUMMARY

In a hydraulic piloted pressure reducing and regulating valve having a body and a control piston therein, the improvement of a fail safe means for holding the valve at the last selected operating pressure in the event of loss of control signals. A pilot piston is provided in the body and is adapted to be connected to a hydraulic pilot pressure. Spring means are connected between the pilot piston and the control piston whereby the valve is regulated in response to the hydraulic pilot pressure but yet the control piston can move in response to valve flow demands. A rod is connected to the pilot piston with a locking sleeve engaging the rod and releasably locking the rod and pilot piston against movement. A hydraulic pressure port is in communication with the space between the rod and the sleeve for releasing the rod from the sleeve upon application of pressure to the port. The port and the pilot piston are separately connected to a hydraulic supply in a control system in spite of various failures the valve will maintain the last selected operating pressure.

A still further object of the present invention is wherein the rod includes a recess for receiving the spring means thereby reducing the length of the valve.

Still a further object of the present invention is wherein the area of the pilot piston is substantially equal to the area of the control piston.

Yet a still further object of the present invention is the provision of a second hydraulic reducing and regulating valve adapted to be connected to a hydraulic fluid supply in which the output of the second valve is connected to the pilot piston of the first valve. An air supply control system is connected to and controls the second hydraulic reducing and regulating valve. An interlock is connected between the air control system and the locking port in which the interlock supplies hydraulic fluid supply to the port when the air supply is changing the pressure setting of the second valve and thus of the first valve. But the interlock disconnects hydraulic fluid from the port when the air supply control system is static thereby the first valve to become locked at its last pressure setting.

Still a further object of the present invention is wherein the interlock includes a hydraulic switching valve connected between the hydraulic supply and the locking port in which the switching valve is movable between a supply position and a vent position. The hydraulic switching valve is connected to the air supply control system and is actuated to the supply system when the air supply is on and is actuated to the vent position when the air supply is off.

Still a further object of the present invention is the provision of a fail safe hydraulic piloted pressure reducing and regulating system for supplying fluid power to subsea equipment including an underwater hydraulic piloted pressure reducing and regulating valve connected to and supplying regulated pressure to subsea equipment. The valve includes a body with a control piston and a pilot piston with spring means between the pilot piston and the control piston whereby the valve is regulated in response to hydraulic pilot pressure applied to the pilot piston. The valve also includes a rod connected to the pilot piston and a locking sleeve engaging the rod and releasably locking the rod and pilot piston against movement. The body includes a locking port in communication with the space between the rod and the sleeve for releasing the rod upon actuation of pressure. A hydraulic signal pressure line is connected to the pilot piston and extends to the water surface. A hydraulic lock line extends from the locking port to the water surface. An air piloted pressure reducing and regulating valve is positioned above the water having an outlet connected to the hydraulic signal pressure line and the air piloted valve has an inlet connected to a hydraulic fluid supply. An air control system is connected to the air pilot valve for controlling the outlet pressure and the pressure in the hydraulic signal pressure line to the underwater valve. A hydraulic switching valve is positioned at the water surface and connected between the hydraulic supply and the hydraulic lock line and is movable between a supply position and a vent position. The hydraulic switching valve is connected to the air supply system and actuated to a hydraulic supply position when the air supply is on and is actuated to the vent position when the air supply is off. Therefore, the locking sleeve is unlocked while pressure changes are being made, but locks the underwater valve after pressure changes are completed.

A further objective is that, in event of failure of the air system at the surface, by using a manually controlled regulator, one could manually adjust the surface regulator to a higher pressure and manually shift the hydraulic switching valve open to adjust the regulated pressure output of the subsea regulator.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 3 is an elevational view, partly in cross section, of another embodiment of the present invention, FIG. 4 is an elevational view, partly in cross section, of still another embodiment of the present invention.

DESCRIPTION OF THE PREFERRED EMBODIMENT

Figure 1:
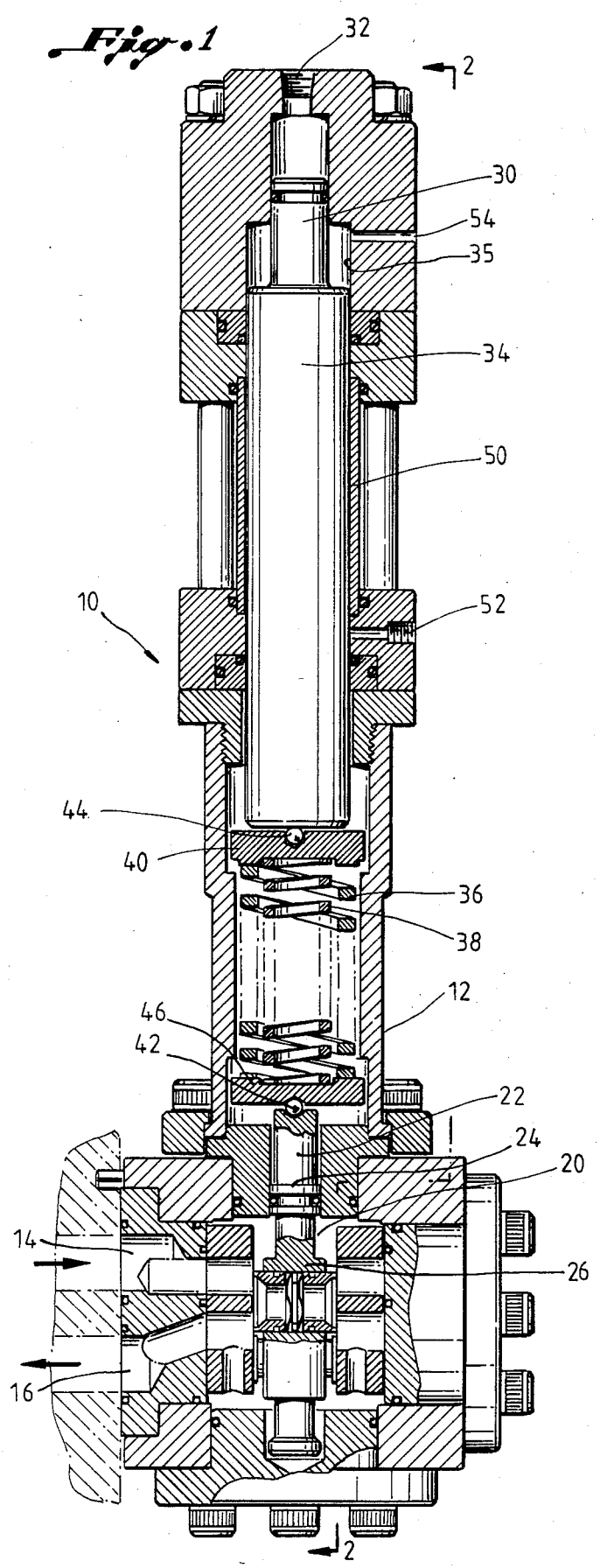
FIG. 1 is an elevational view in cross section of one embodiment of the hydraulically piloted pressure reducing and regulating valve of the present invention.

Referring now to the drawings, and particularly to FIG. 1, the reference numeral 10 generally indicates the hydraulic piloted pressure reducing and regulating valve of the present invention and generally includes a body 12 having a fluid inlet 14, a fluid outlet 16 and a vent (not shown). Generally, a hydraulic pressure supply source is connected to the inlet 14 and hydraulic pressure is supplied at the outlet 16 which is reduced and regulated for operating other equipment. The body 12 has a body cavity 20, a plunger 22 movable in the body and control piston 24 connected to the plunger 22 and exposed to pressure in the body cavity 20.

A seal container 26 is connected to the piston 24 and is movable in the body cavity 20. The seal container 26 contains a plurality of openings and seals as are conventional to move relative to the fluid inlet port 14, outlet 16 and vent to provide a reduced and regulated outlet flow. A fuller description of a suitable pressure reducing and regulating valve is move fully described in U.S patent application Ser. No. 339,554, filed Jan. 15, 1982, which is incorporated herein by reference. The above description is generally conventional and any other suitable pressure reducing and regulating valves may be utilized.

In pilot actuated pressure reducing and regulating valves, the piston 24 is subjected to various pilot actions such as a manual screw, a hydraulic control pressure, or an air control pressure. The present invention is directed to a hydraulic piloted pressure regulating valve which is fail safe in order to provide a regulating valve that stays at its last selected operating pilot pressure. That is, with existing hydraulic piloted valves the hydraulic pilot pressure acts against the second side of the control piston 24 so that the output of the valve 10 is regulated at a desired pressure. However, if the pilot control signal is lost, such as caused by a broken line, a loss in hydraulic supply fluid providing the pilot signal or a loss of other control signals such as an air supply control signal then the pilot control signal would be equivalent to issuing a signal of zero, which would signal the valve 10 to vent off the regulated pressure to zero. This, of course, would prevent the actuation of any apparatus which is supplied hydraulic power supply from the outlet of valve 10.

Referring now to FIG. 1, the present invention includes a separate pilot piston 30 positioned in the body 12 and is exposed to a hydraulic pilot pressure port 32. The piston 30 includes a rod 34. Suitable spring means such as springs 36 and 38 may be provided between the pilot piston 30 and the control piston 24 such as between spring plates 40 and 42 and if desired bearing balls 44 and 46. Thus, as piloted hydraulic pressure is communicated to the port 32 the piston 30 and piston rod 34 will telescopically move in the housing 12 in response to the pilot pressure thereby applying the pilot force to the springs 36 and 38 which in turn apply the pilot control force to the control piston 24 for adjusting its position in the body 12 relative to the regulated pressure in the cavity 20 for regulating the pressure output in the outlet 16. Because of the springs 36 and 38, the control piston 24 can move in response to the flow demands of the valve 10 and to the pressures encountered in the cavity 20.

In order to hold the piston 30 in position in the event of a loss of pilot pressure at the port 32 for various reasons, a locking sleeve 50 is provided engaging and surrounding the piston rod 34. Normally, the sleeve forms an interference fit with the outside diameter of the piston rod 34 to provide a mechanical lock to lock the rod 34 in any telescoping position. However, when hydraulic pressure is introduced between the interior diameter of the sleeve 50 and the outside diameter of the rod 34, the sleeve 50 expands outwardly radially and relieves the interference to provide a sufficient clearance for the piston rod 34 to be moved. The locking sleeve 50 may be re-engaged merely by removing pressure at the locking port 52. The locking sleeve is sold under the trademark "Bear-Loc" by York Industries, Inc. Suitable seals are provided around the piston rod 34 and locking sleeve 50 to contain the various pressures. A vent port 54 is provided in the body 12 for allowing movement of the piston rod 34 in the cylinder 35. Preferably, the cross-sectional area of the pilot piston 30 is substantially equal to the cross-sectional area of the control piston 24 whereby the output from the regulator 10 will be substantially equal to the pressure of the signal input at the port 32.

The sleeve lock 50 may be unlocked to allow the pilot pressure acting on the pilot piston 30 to adjust the regulated output of the valve 10 as desired and thereafter the sleeve 50 may be locked to maintain the pressure output from the valve 10 at the prior set pressure rating even in the event of a failure in the control system.

Figure 2:
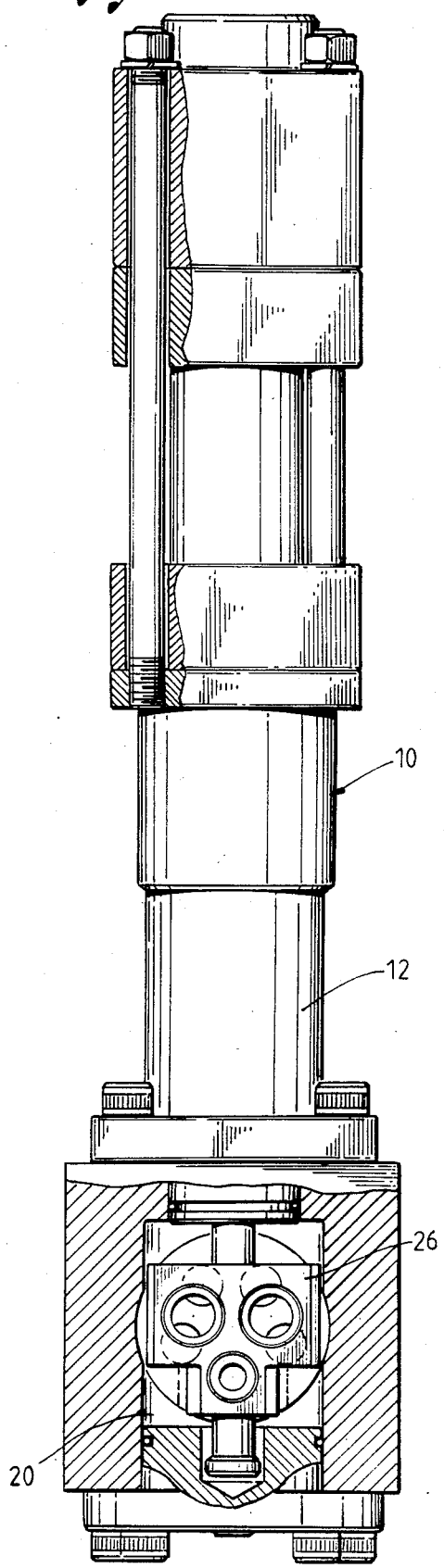
FIG. 2 is a side view of the valve of FIG. 1.

Other and further modifications of the valve 10 may be made as best seen in FIGS. 3 and 4 wherein like parts are numbered similar to those in FIGS. 1 and 2 with the addition of the suffix "a" and "b", respectively. In both the valve 10a and 10b the springs have been recessed in the piston rod in order to shorten the overall length of the valve which is desirable. Thus, in FIG. 3 the springs 36a and 38a are encased within the piston rod 34a but are still between the pilot piston 30a and the control piston 24a.

It is to be noted in FIG. 3 that the pilot piston 30a has an annular piston area substantially equal to the control piston 24a whereby the pilot control pressure at the port 32a will result in substantially the same regulated pressure output of the valve 10a. A second vent 54'a is provided between pilot port 32a and lock port 52a to prevent leakage of seals for either pilot or lock port pressure inadvertently affecting other functions. Furthermore, in FIG. 4, the cross-sectional area of the piston 30b is also approximately equal to the cross-sectional area of the piston 24b to provide a one-to-one pressure control ratio. Other pressure ratios may be used.

Figure 5:
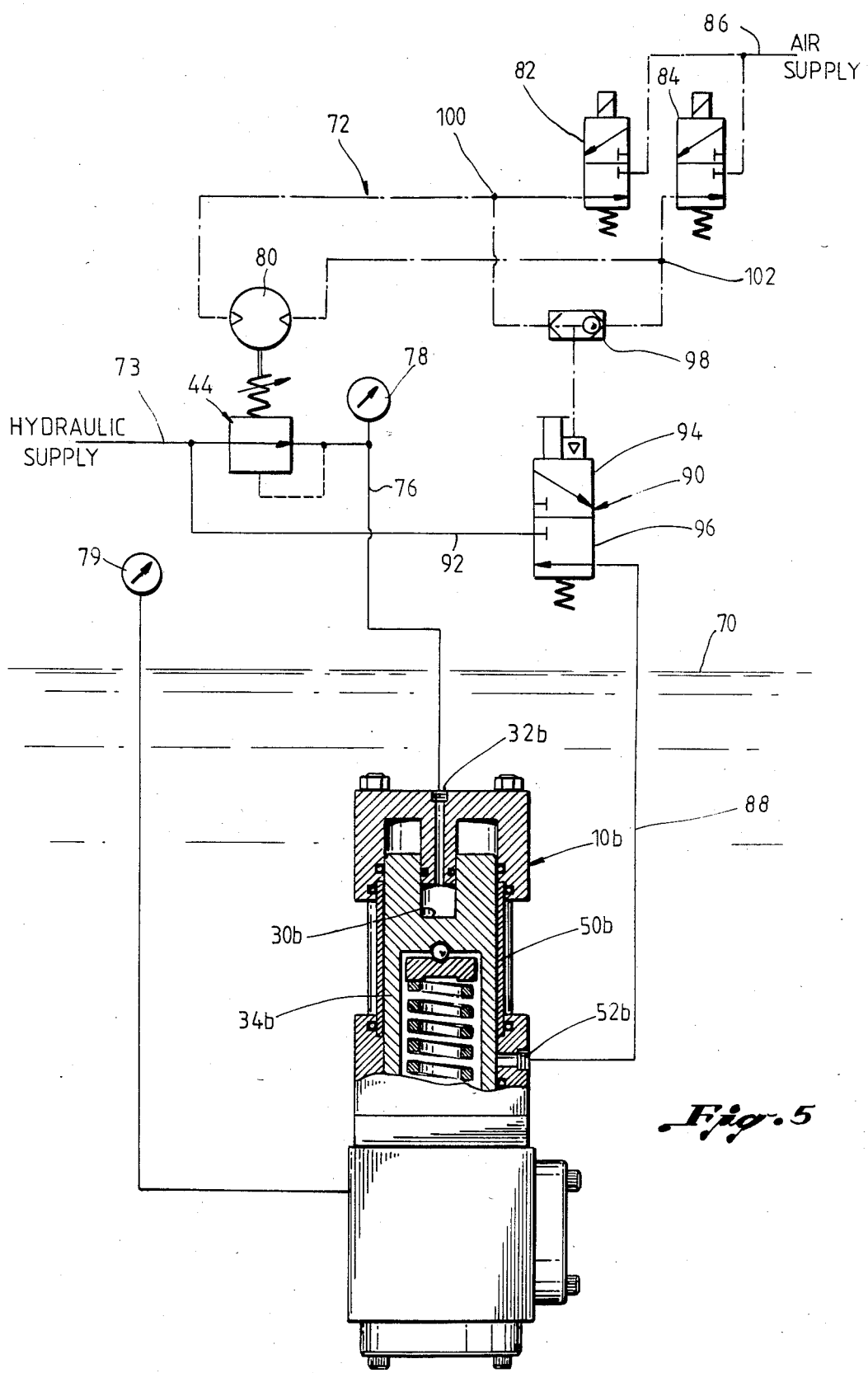
FIG. 5 is a schematic view of a valve of the present invention in a control circuit.

Referring now to FIG. 5, a suitable control circuit for operating a hydraulic piloted pressure reducing and regulating valve 10b is best seen. For purposes of illustration, it will be assumed that the valve 10b is below a water surface 70 for receiving underwater hydraulic power and for regulating the pressure of the hydraulic power supply to actuate underwater equipment. The above water control circuit is generally indicated by the reference numeral 72. A second pilot operated hydraulic pressure reducing and regulating valve 74 is provided such as an air motor operated hydraulic pressure reducing and regulating valve such as Part No. 1111-8700, sold by Koomey, Inc., or an air diaphragm operated valve, Part No. 1111-3100, sold by Koomey, Inc. Valve 74 has its inlet connected to a hydraulic supply 73 such as 3,000 psi and an outlet connected to a hydraulic signal pressure line 76 which is connected to the pilot port 32b and thus to the pilot piston 30b of the valve 10b. Preferably, gauge 78 measures the output and thus the pilot pressure being supplied to the pilot piston 30b. Gauge 79 measures the output pressure of valve 10b.

The surface pressure regulator 74 is controlled by its pilot air motor 80 which in turn adjusts the regulator 74 by valve 82 or 84. Valves 82 and 84 are connected to an air control supply 86 and by actuation of one of the valves the motor 80 is rotated in one direction such as to increase the regulated pressure from the valve 74 or rotated in the opposite direction to decrease the regulated pressure. Thus actuation of the valve 82 actuates the air motor 80 in a direction to increase the regulated pressure from the valve 74 which in turn increases the regulated pressure of the surbsurface pressure regulating valve 10b. Valve 84 actuates the motor 80 to decrease the regulated pressure.

However, without the locking sleeve 50b if the hydraulic supply 73 were lost, the pilot pressure line 76 was broken, or the control circuit 72 failed, or the air supply 86 was lost, the pilot signal to the pilot piston 30b would be lost which would be equivalent to issuing a command signalling the valve 10b to vent off its regulated pressure at its outlet 18 to zero. This would result in a failure to supply fluid to the subsea equipment being controlled by the valve 10b. This could be a catastrophe in the case where the subsea equipment was a blowout preventer to protect an oil or gas well from a blowout.

However, the locking sleeve 50b provides a fail safe design that holds the pressure regulating valve 10b at its last selected operating pressure irrespective of the loss of the pilot pressure signal to the pilot pressure piston 30b. That is, the port 52b which controls the position of the locking sleeve 50b is connected separately to the hydraulic supply 73 and to the control system 72 whereby various failures will still allow the valve to maintain its last selected operating pressure. The locking port 52b is connected by a hydraulic lock line 88 to a hydraulic switching valve 90 positioned above the water surface. The valve 90 is connected between the hydraulic supply 73 by a hydraulic line 92 and includes a first position 94 for supplying hydraulic fluid to the line 88 and is movable to a second position 96 for venting pressure from the hydraulic lock line 88. The hydraulic switching valve 94 is controlled by the air supply control circuit 72 through a shuttle valve 98. The shuttle valve 98 is connected at points 100 and 102 which are the pressure outputs of the valves 82 and 84, respectively. Thus, any time one of the valves 82 or 84 is supplying air pressure to the control motor 80, control pressure is supplied to the shuttle valve 98 to actuate the pilot on the switching valve 94 to transmit hydraulic fluid to the hydraulic lock line 88, to the port 52b to unlock the locking cylinder 50b. That is, each time it is desired to change the regulation of the second regulating valve 74 in order to change the pilot pressure to the valve 10b, the locking sleeve 50b is unlocked. After the air motor 80 has been moved to the desired position to regulate the valve 74b at the desired pressure, the valves 82 and 84 are released to vent position. This will vent the pilot control on the valve 90 through the shuttle valve 98 and will move the valve 90 to the vent position 96 which in turn vents the lock line 88 and allows the locking sleeve 50b to lock and hold the rod 34b and piston 30b in the locked position. Therefore, the valve 10b will remain in the locked position until the control system 72 is again actuated to change the pressure output of the valve 10b. However, in the meanwhile, if any failure occurs in the system due to the loss of the hydraulic supply fluid 73, the breaking of lines 76 or 88, the loss of air pressure 86, or a failure in the control system 72, the valve 10b will remain locked and will hold its output at the last selected operating pressure. This means that the equipment which it controls will continue to receive the last regulated actuating pressure and can be operated.

Furthermore, if only the air system is disabled, the regulator 74, since it also is a manually actuated regulator, could be manually adjusted to provide the desired pressure output. At the same time valve 90 could be manually actuated to unlock sleeve 50b and the valve 10b could be suitably adjusted.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. In a hydraulic pilot pressure reducing and regulating valve having a body and a control piston therein, the improvement of a fail safe means for holding the valve at the last selected operating pressure in the event of loss of control signals comprising, a pilot piston in said body and adapted to be connected to hydraulic pilot pressure, spring means between the pilot piston and the control piston whereby the valve is regulated in response to hydraulic pilot pressure, a rod connected to the pilot piston, a locking sleeve normally gripping the rod and releasably locking the rod and pilot piston against movement, a hydraulic pressure port in communication with the space between the rod and the sleeve for releasing the rod from the sleeve upon application of pressure to said port, said port and said pilot piston separately connected to a hydraulic supply and a control system, and said control system including means for controlling the application of the hydraulic supply to said port and said piston, said means connecting the hydraulic supply to the port for releasing the locking sleeve when the hydraulic supply to the piston is changing, but venting the hydraulic supply to its port when hydraulic supply to the piston is static thereby allowing the locking sleeve to lock for maintaining the valve in its last selected operating pressure.

2. The apparatus of claim 1 wherein the said rod includes a recess for receiving said spring means.

3. The apparatus of claim 1 wherein the area of the pilot piston is substantially equal to the area of the control piston.

4. The apparatus of claim 1 including,
a second hydraulic reducing and regulating valve adapted to be connected to a hydraulic fluid supply, the output of said second valve connected to the pilot piston,
an air supply control system connected to and controlling the second hydraulic reducing and regulating valve,
an interlock connected between the air control system and the port, said interlock supplying hydraulic fluid supply to said port when the air supply is changing the pressure setting of the second valve and thus of the first valve, but said interlock disconnecting hydraulic fluid from said port when the air supply control system is static.

5. The apparatus of claim 4 wherein the interlock includes,
a hydraulic switching valve connected between the hydraulic supply and said port, said valve movable between a supply position and a vent position,
said hydraulic valve connected to the air supply control system and actuated to the hydraulic supply position when the air supply is on and is actuated to the vent position when the air supply is off.

6. A fail safe hydraulic piloted pressure reducing and regulating system for supplying fluid power to subsea equipment comprising,
a hydraulic piloted pressure reducing and regulating valve positioned underwater and connected to and supplying regulated pressure to subsea equipment, said valve including a body and a control piston, and a pilot piston, and spring means between the pilot piston and the control piston whereby the valve is regulated in response to hydraulic pilot pressure applied to the pilot piston,
said underwater valve including a rod connected to the pilot piston, and a locking sleeve engaging the rod and releasably locking the rod and pilot piston against movement, said body including a port in communication with the space between the rod and the sleeve for releasing the rod from the sleeve upon application of pressure to said port,
a hydraulic signal pressure line connected to the pilot piston and extending to the water surface,
a hydraulic lock line extending from the port to the water surface,
an air piloted pressure reducing and regulating valve above the water having an outlet connected to the hydraulic signal pressure line, said air piloted valve having inlet connected to a hydraulic fluid supply,
an air control system connected to the air pilot valve for controlling the outlet pressure and the pressure in the hydraulic signal pressure line,
a hydraulic switching valve positioned at the water surface and connected between a hydraulic supply and the hydraulic lock line to said port, said switching valve movable between a supply position and a vent position,
said hydraulic switching valve connected to the air supply control system and actuated to the hydraulic supply position when the air supply is off and actuated to the vent position when the air supply is on.

7. The invention of claim 6 wherein, said air piloted pressure reducing and regulating valve is also manually adjustable, and
said hydraulic switching valve is also manually actuable whereby the underwater valve can be regulated manually in the event of loss of air supply.

* * * * *